US012385782B2

(12) United States Patent
Milsap et al.

(10) Patent No.: US 12,385,782 B2
(45) Date of Patent: Aug. 12, 2025

(54) SPECTROSCOPY SOURCE-DETECTOR LINK QUALITY ANALYZER

(71) Applicant: The Johns Hopkins University, Baltimore, MD (US)

(72) Inventors: Griffin W. Milsap, Columbia, MD (US); Clara A. Scholl, Columbia, MD (US); Marisel Villafane-Delgado, Laurel, MD (US); Brian S. Robinson, Ellicott City, MD (US); Margaret C. Thompson, Seattle, WA (US)

(73) Assignee: The Johns Hopkins University, Baltimore, MD (US)

( * ) Notice: Subject to any disclaimer, the term of this patent is extended or adjusted under 35 U.S.C. 154(b) by 440 days.

(21) Appl. No.: 18/048,990

(22) Filed: Oct. 24, 2022

(65) Prior Publication Data

US 2023/0127013 A1  Apr. 27, 2023

Related U.S. Application Data

(60) Provisional application No. 63/270,869, filed on Oct. 22, 2021.

(51) Int. Cl.
*G01J 3/433* (2006.01)
*G01J 3/36* (2006.01)

(52) U.S. Cl.
CPC ............ *G01J 3/433* (2013.01); *G01J 3/36* (2013.01)

(58) Field of Classification Search
CPC . A61B 5/05; A61B 5/0042; A61B 6/00; G01J 3/433; G01J 3/36; G01J 3/0297; G01J 3/42; G01J 2003/102; G01J 3/0218
See application file for complete search history.

(56) References Cited

U.S. PATENT DOCUMENTS

| | | | | |
|---|---|---|---|---|
| 6,282,438 B1* | 8/2001 | Maki | ................. | A61B 5/14553 356/342 |
| 6,445,362 B1* | 9/2002 | Tegreene | ........... | G02B 26/0841 345/530 |
| 8,160,678 B2* | 4/2012 | Cropper | ............... | A61B 1/0623 623/902 |
| 2013/0321898 A1* | 12/2013 | Heinemann | .......... | G02B 26/124 359/305 |
| 2014/0228701 A1* | 8/2014 | Chizeck | ................. | G06F 3/015 600/544 |

* cited by examiner

*Primary Examiner* — Abdullahi Nur
(74) *Attorney, Agent, or Firm* — Sung T. Kim

(57) ABSTRACT

A spectroscopy system includes a plurality of light sources, a plurality of detectors, and control circuitry. The control circuitry may be configured to control each light source to output frequency modulated light beams into an object and receive detector-specific data from the detectors. The detector-specific data may be representative of scattered and unabsorbed light resultant from the frequency modulated light beams interacting with the object. The control circuitry may be further configured to determine, for a source-detector link defined by a pairing of a first light source with a first detector, a link phase differential based on received phase information extracted from the detector-specific data for the source-detector link and source phase information of a first frequency modulated light beam from the first light source. Also, the control circuitry may be configured to determine a source-detector link quality metric for the source-detector link based on the link phase differential.

20 Claims, 7 Drawing Sheets

SPECTROSCOPY SOURCE-DETECTOR LINK QUALITY ANALYZER

CROSS-REFERENCE TO RELATED APPLICATIONS

This application claims the benefit of U.S. Provisional Application No. 63/270,869 filed on Oct. 22, 2021, the entire contents of which are hereby incorporated herein by reference.

TECHNICAL FIELD

Exemplary embodiments generally relate to spectroscopy, and more specifically relate to analysis of link quality between a source and detector of a spectroscopy system.

BACKGROUND

Spectroscopy involves the measurement and interpretation of electromagnetic spectra resulting from interaction of source electromagnetic radiation with a targeted medium. The information that can be collected from analyzing such electromagnetic spectra has been determined to be useful in a number of practical applications. For example, spectroscopy can be used to detect brain function and brain activity through analysis of radiant energy that is scattered or absorbed by the brain. To collect such spectroscopy data, light sources may generate light that is passed through or reflected from a target object, such as the brain, and collected by detectors. The detectors convert the received light into signals that can be received and processed for analysis.

While such spectroscopy systems often generate useful data for analysis, in some instances, the spectroscopy data is unreliable due to, for example, the presence of noise or other environmental conditions that can corrupt and destroy the usefulness of the data. If the occurrence of such corruption of the data is left undetected, the results of a spectroscopy analysis can be unreliable leading to false or meaningless results. As such, further innovation in technologies that facilitate spectroscopy solutions is needed to avoid such undesired outcomes.

BRIEF SUMMARY OF SOME EXAMPLES

According to some example embodiments, a spectroscopy system is provided. The spectroscopy system may comprise a plurality of light sources, a plurality of detectors, and control circuitry. The plurality of light sources may comprise a first light source. Each light source may be configured to output a frequency modulated light beam of a different frequency than the other light sources. The first light source may be configured to output a first frequency modulated light beam at a first frequency. The plurality of detectors may comprise a first detector. Each detector may be configured to receive light and provide detector-specific data representative of the received light. A pairing of a light source with a detector may be a source-detector pair that defines a source-detector link. The control circuitry may be configured to control each light source to output the frequency modulated light beams into an object and receive detector-specific data from the first detector. The detector-specific data may be representative of scattered and unabsorbed light received at the first detector resultant from the frequency modulated light beams interacting with the object. The control circuitry may be further configured to determine, for a source-detector link defined by a pairing of the first light source with the first detector, a link phase differential based on received phase information extracted from the detector-specific data for the source-detector link and source phase information of the first frequency modulated light beam, and determine a source-detector link quality metric for the source-detector link based on the link phase differential.

Additionally, according to some example embodiments, a system for spectroscopy data analysis is provided. The system may comprise circuitry configured to receive detector-specific data from a first detector. The first detector may be one of a plurality of detectors within a spectroscopy system. The detector-specific data may be representative of scattered and unabsorbed light received at the first detector resultant from frequency modulated light beams from a plurality of light sources interacting with an object. A first light source may be one of the plurality of light sources that outputs a first frequency modulated light beam at a first frequency. The circuitry may be further configured to determine, for a source-detector link defined by a pairing of the first light source with the first detector, a link phase differential based on received phase information extracted from the detector-specific data for the source-detector link and source phase information of the first frequency modulated light beam, and determine a source-detector link quality metric for the source-detector link based on the link phase differential. The circuitry may be further configured to extract source-detector link data for the source-detector link from the detector-specific data based on the first frequency, and discard the source-detector link data to eliminate the source-detector link data from a subsequent data analysis in response to the source-detector link quality metric exceeding a threshold.

According to some example embodiments, a method for spectroscopy data analysis is provided. The method may comprise receiving detector-specific data from a first detector. The first detector may be one of a plurality of detectors within a spectroscopy system. The detector-specific data may be representative of scattered and unabsorbed light received at the first detector resultant from frequency modulated light beams from a plurality of light sources interacting with an object. A first light source may be one of the plurality of light sources that outputs a first frequency modulated light beam at a first frequency. The method may further comprise determining, for a source-detector link defined by a pairing of the first light source with the first detector, a link phase differential based on received phase information extracted from the detector-specific data for the source-detector link and source phase information of the first frequency modulated light beam, and determining a source-detector link quality metric for the source-detector link based on the link phase differential. The method may additionally comprise extracting source-detector link data for the source-detector link from the detector-specific data based on the first frequency, and discarding the source-detector link data to eliminate the source-detector link data from a subsequent data analysis in response to the source-detector link quality metric exceeding a threshold.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
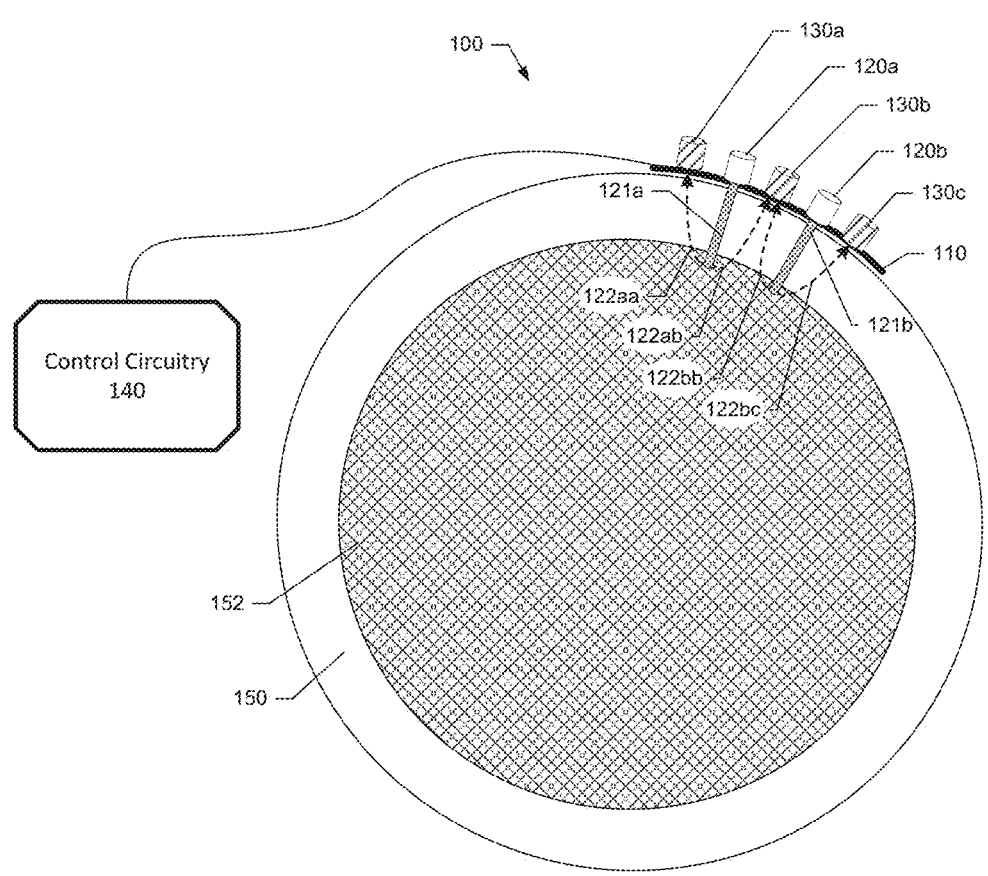
FIG. 1 illustrates an example brain-computer interface spectrometry system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Systems, apparatuses, and methods, in accordance with various example embodiments, are described herein that involve the analysis of spectroscopy data to identify low quality data that, for example, may be removed from consideration in a subsequent application of the data. In this regard, according to some example embodiments, an example method is provided that determines a phase differential for spectroscopy data received from a detector that is used to generate a metric for assessing of the quality of the data. The phase differential is determined relative to the phase of a source light beam that is modulated at a certain, known frequency and phase. Since the frequency and phase of the source light can be known, the effect of the light's interaction with the target object can be determined with respect to changes in the phase of the light received at the detector. If repeated determinations of the phase differential are made over time, then, according to some example embodiments, a stability of the phase differential can also be determined as a stability metric for spectroscopy data. According to some example embodiments, the stability may be a measure of the variation or volatility of the phase differential value, with low volatility being an indicator of a highly stable phase differential and high quality spectroscopy data, and high volatility being an indicator of low stability for the phase differential and low quality spectroscopy data.

As such, it has been determined that data having relatively high phase differential stability is of higher quality and is more reliable than data having relatively low phase differential stability. In some example embodiments, phase differential stability may be determined for a link between particular source and a particular detector to be used a measure of the link quality for that specific source-detector pair and the data resulting from the interaction of the source-detector pair. In some example embodiments of a spectroscopy system, a number of sources and detectors may be utilized over an area. In order to determine a link quality for each source-detector pair, each source may output light at a unique frequency relative to other light sources within the spectroscopy system. Since each source may output light at a different frequency into the target object, the contribution of a particular light source to the light received at a particular detector can be determined from, for example, the frequency components within the received light. According to some example embodiments, while the light from a given source received at the detector may be phase shifted due to interaction with the object, the frequency of the received light signal may be used to identify the given source of the received light based on the unique frequency. Accordingly, the component of the signal at the given frequency can be analyzed to determine a quality metric for the source-detector link formed between the given source and the detector. This component of the received signal can be analyzed to determine a phase differential relative to the source signal, and, by making further determinations of the phase differential over time, a stability of phase differential for source-detector link may be determined. The stability measure may be used a metric for determining the quality of the data being received in association with the source-detector link. The metric can therefore be used as a measure of the link quality for the source-detector pair. In systems with numerous sources and numerous detectors, a link quality metric for each source-detector pair, or for each source-detector link, can be determined.

As mentioned above, after determining the link quality metric for each source-detector pair, data that is associated with source-detector links that is below a given quality metric threshold may be, for example, discarded from further application analysis or weighted in accordance with the link quality metric. Poor quality data may be weighted less than high quality data or poor quality data may be discarded to ensure that a subsequent spectrometry application analysis has increased reliability and usefulness due to the absence of the discarded data.

As mentioned above, an example application in which spectrometry data is collected and analyzed may be a brain-computer interface (BCI) application. In such an implementation, light sources direct light beams into the brain and reflections of the light beams may be received at detectors. The interaction of the light beam with the brain causes scattering and absorption of the light and introduces information into the reflected light in the form of features that are indicative of brain activity and can be analyzed to make conclusions about the type of brain activity that is occurring. While some applications may utilize reflected light from an object such at the brain within a reflective system, it is understood that some example embodiments may be in a transmission configuration that utilize direct light that is transmitted through an object to be received by the detector.

An example embodiment of such a BCI spectrometry system is shown in FIG. 1. The system 100 may comprise a cap 110 configured to be secured to an individual's head at a desired location (e.g., external to the frontal cortex) to capture brain activity at the desired location. The cap 110 may be applied to the scalp on an exterior of the head. The cap 110 may operate as a base for securing various components including a plurality of light sources including light sources 120a and 120b and a plurality of detectors including detectors 130a, 130b, and 130c. The light sources and detectors may be in communication with, and controlled by, control circuitry 140.

The light sources 120a and 120b may be, according to some example embodiments, any type of light source that outputs a radiant energy (light) beam with some directionality at a wavelength or frequency that can penetrate into the targeted object, in this case through the skull 150 and into the brain 152. Based on their positioning, the light sources 120a and 120b may be configured to direct a focused light beam through the skull 150 and into the brain 152 at a desired location for the particular light source. The light sources 120a and 120b may be light emitting diodes (LED), lasers, or other light sources. The light sources 120a and 120b may be controllable, by the control circuitry 140, to output a light beam of a desired frequency (or wavelength) or the light sources 120a and 120b may operate at a fixed frequency or wavelength. Accordingly, the light beam output by the light sources 120a and 120b may be a frequency-modulated light beam, where each light source is assigned, and outputs, a light beam of a different frequency. According to some example embodiments, each of the light sources 120a and 120b may operate at a different frequency that is either fixed or controlled. Accordingly to some example embodiments, the light sources 120a and 120b may operate in the near-infrared spectrum (i.e., wavelengths of about 700 nanometers (nm) to about 1200 nm). However, according to some example embodiments, other frequencies/wavelengths may be utilized that may be in the mid-infrared spectrum (e.g., from about 1300 nm to about 3000 nm), the far-infrared spectrum (e.g., from about 3 micrometers (μm) to about 1000 μm), the ultraviolet spectrum, or visible spectrum. According to some example embodiments, the light sources 120a and 120b may be configured to operate at a wavelength in the range of 690 nm to 3000 nm.

The detectors 130a, 130b, and 130c may be, according to some example embodiments, any type of detection device or sensor capable of receiving radiant energy (light) and converting the received light into an electrical signal for processing. In this regard, the detectors 130a, 130b, and 130c may be specifically configured to detect or sense light at certain wavelengths. According to some example embodiments, the detectors 130a, 130b, and 130c may be charge coupled devices (CCDs), such as, for example, Silicon-based CCDs that may operate within the near-infrared spectrum. According to some example embodiments, the detectors 130a, 130b, and 130c may be Indium gallium arsenide (InGaAs) or Lead (II) sulfide (PbS) CCDs. In some example embodiments, the detectors 130a, 130b, and 130c may comprise combinations of materials to expand the spectral range of the devices.

The control circuitry 140 may comprise a processing device configured to control the light sources 120a and 120b and the detectors 130a, 130b, and 130c. In this regard, the control circuitry 140 may be configured to control the light sources 120a and 120b to output a respective light beam. Additionally, according to some example embodiments, the control circuitry 140 may be configure to control the frequency or wavelength of the light beam that a given light source outputs. According to some example embodiments, the control circuitry 140 may also control the intensity of the light beam output by a light source. Further, the control circuitry 140 may be configured to receive electrical signals from the detectors 130a, 130b, and 130c indicative of the characteristics of the light being received by the respective detectors. The control circuitry 140 may receive such signals as detector-specific data. The control circuitry 140 may be configured to perform signal processing on the detector-specific data. According to some example embodiments, the control circuitry 140 may be configured to decompose the detector-specific data to isolate frequency-based components of the detector-specific data that can be associated with a light source that outputs a light beam at an associated frequency. Additionally, as further described herein, the control circuitry 140 may be configured to process the detector-specific data to determine a data quality metric for source-detector links associated with the detector-specific data associated with a particular source. The control circuitry 140 may also be configured to process the detector-specific data in association with a particular application (e.g., brain activity analysis application) to perform a task (e.g., move a robotic arm), to make a health-related diagnosis, or the like.

As shown in FIG. 1, each of the detectors 130a, 130b, and 130c may be positioned adjacent to a light source 120a and 120b on the cap 110. Such adjacent positioning may increase the quantity of light (photons) received at the detectors 130a, 130b, and 130c from light reflections and reduce the distance that the light must travel between the source and the detector. In this regard, light source 120a is shown as outputting a light beam 121a at a first frequency (e.g., having a wavelength of 692 nm) through the skull 150 and into the brain 152, and light source 120b is shown as outputting a light beam 121b at a second frequency (e.g., with a wavelength of 850 nm) through the skull 150 and into the brain 152. As shown in FIG. 1, the light beams 121a and 121b may be absorbed by and reflected from the brain tissue, and the reflections may be received by the detectors 130a, 130b, and 130c. More specifically, reflected light 122aa and reflected light 122ab, originating from light beam 121a, may be received by the adjacent detectors 130a and 130b, respectively. Although not shown, the detector 130c may also receive light originating from light beam 121a. Similarly, reflected light 122bb and reflected light 122bc, originating from light beam 121b, may be received by the adjacent detectors 130b and 130c, respectively. Again, although not shown, the detector 130c may also receive light originating from light beam 121a, and the detector 130a may receive light from beam 121b. As shown, detector 130b receives reflected light 122ab and 122bb, which originate from different light sources, i.e., light source 120a and 120b, respectively. The light received by the various detectors may include components that originated from the different light sources, and the control circuitry 140 may use the differing frequencies of the light beams output from the different sources to isolate the components.

A detector and source combination may be considered a source-detector pair. Since, for example, light within the neural tissue of the brain is not contained, any one detector may receive light from any one light source. As such, each source and each detector within the system may define a respective source-detector pair that share a link. As shown with respect to detector 130b, a given detector may be party to more than one source-detector pair. Further, as shown for both light sources 120a and 120b, a given source may also be party to more than one source-detector pair. Each source-detector pair may be referred to as having a link, which references the light path form the source to the detector. As mentioned above, a link may, for example, be a high quality link that results in the source-detector pair generating reliable link data, or a link may, for example, be a low quality link that results in the source-detector pair generating unreliable link data. As such, according to some example embodiments, the quality of the link may be measured based on a phase differential stability between the phase of the light beam provided by the source and the phase of the reflected light received at the detector.

Figure 2:
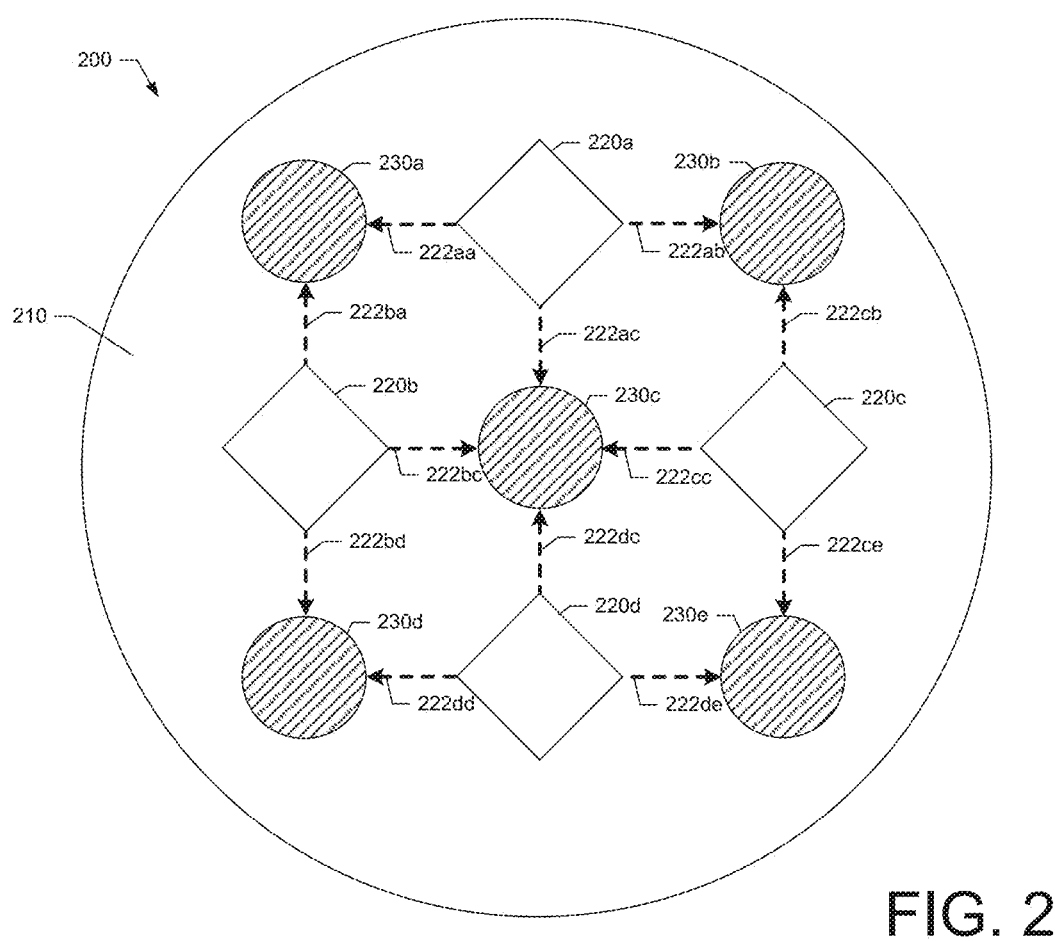
FIG. 2 illustrates an example source-detector arrangement according to some example embodiments.

Having described a simplified variation of the source-detector arrangement in FIG. 1 (i.e., a single dimension arrangement), another example source-detector apparatus 200 in a two-dimensional arrangement is shown in FIG. 2. In this regard, the apparatus 200 may comprise a base 210, which may be the same or similar to the cap 110 of FIG. 1. Additionally, the base 210 may have a plurality of light sources and a plurality of detectors affixed in a static positions on the base 210. The plurality of light sources (shown as diamonds in FIG. 2) may comprise light sources 220a, 220b, 220c, and 220d. The plurality of detectors (shown as circles in FIG. 2) may comprise detectors 230a, 230b, 230c, 230d, and 230e. The light sources 220a, 220b, 220c, and 220d may be same or similar in construction and operation as the light sources 120a and 120b described above. The detectors 230a, 230b, 230c, 230d, and 230e may be same or similar in construction and operation as the detectors 130a, 130b, and 130c described above.

The layout of the sources and detectors in the two-dimensional arrangement shown in FIG. 2 is an example arrangement where each detector is interleaved between two or more sources. It is noted that, while the layout of FIG. 2 has a square, matrix-type symmetry, various other layouts are contemplated, such as circle-based layouts, random layouts, or the like.

As such, the sources and detectors as described above, may define source-detector links within the two-dimensional arrangement. In this regard, each coupling of a detector with an adjacent source is shown within FIG. 2 as defining a link. As such, link 222aa may be defined from the source 220a to the detector 230a, link 222ab may be defined from the source 220a to the detector 230b, link 222ba may be defined from the source 220b to the detector 230a, link 222ac may be defined from the source 220a to the detector 230c, link 222cb may be defined from the source 220c to the detector 230b, link 222bc may be defined from the source 220b to the detector 230c, link 222cc may be defined from the source 220c to the detector 230c, link 222bd may be defined from the source 220b to the detector 230d, link 222dc may be defined from the source 220d to the detector 230c, link 222ce may be defined from the source 220c to the detector 230e, link 222dd may be defined from the source 220d to the detector 230d, and link 222de may be defined from the source 220d to the detector 230e. While such adjacency links may be defined, additional links may also be defined resulting from a detector receiving light that is sourced from a non-adjacent light source. Accordingly, such a two-dimensional arrangement can result in numerous source-detector pairs and associated links, of which some may operate as high quality links, while others may be low quality. With such a large number of links in such a relatively small arrangement, the ability to apply a metric to ascertain the link quality can be valuable.

Such example embodiments of implementations of spectrometry systems may be leveraged for a number of different applications. In some example embodiments, the systems 100 and 200 may be used, for example, in a functional near-infrared spectroscopy (fNIRS) implementation. Such an example implementation may be useful in measuring cerebroneural hemodynamics or blood flow in the brain. The light sources may inject, for example, near-infrared light in a wavelength range of 690 to 850 nm into the medium, in this case the neural tissue, and photons remaining after interaction with the tissue may be received by the detectors, as described above. In such an implementation, for example, cortical neurons, which absorb oxygen from the blood, can cause a measurable change of the number of photons that successfully travel from the source to the detector without being absorbed by the tissue. As such, the received photons may encode information about the blood flow within the neural tissue, which can be interpreted for use in a variety of practical applications.

Such applications may, however, be inhibited by poor quality source-detector links and resultant data that, if used in various analyses, may lead to inaccuracies and unreliable results. In an effort to identify low quality data, some conventional solutions rely on the standard deviation of the log-mean light level between a source and detector as a metric for link quality. However, such a metric may suffer from various inadequacies, one of which being that the resultant value is an unbounded indicator having no finite range. Additionally, the reliance on light level alone as the basis for determining link quality results in low accuracy metric, particularly in certain contexts, such as in the frequency-domain extension of fNIRS.

The frequency-domain extension of fNIRS, or FD-fNIRS, leverages high frequency modulation (e.g., about 200 megaHertz (MHz)) of the output light beam of a light source. Some FD-fNIRS systems may operate at other frequency modulations, such as greater than 10 MHz, greater than 50 MHz, or greater than 100 MHz. FD-fNIRS implementations can be applied in wide variety of applications including commercial BCI applications. FD-fNIRS systems can operate to improve neural imaging of brain hemodynamic responses, relative to conventional magnitude measurements from continuous wave (CW) fNIRS systems, by providing additional measurements associated with the phase of the received light at a detector. According to some example embodiments, phase measurements can be leveraged to improve accuracy in decoding motor activity and laterality of movement. Combining magnitude and phase information using FD-fNIRS can significantly improve classification accuracy of motor conditions at the population level, relative to the CW-fNIRS analogue represented by a magnitude signal alone. Further, FD-fNIRS systems can provide numerous benefits over CW-fNIRS for neural decoding applications and therefore FD-fNIRS offers a superior solution for non-invasive neural imaging.

Figure 3:
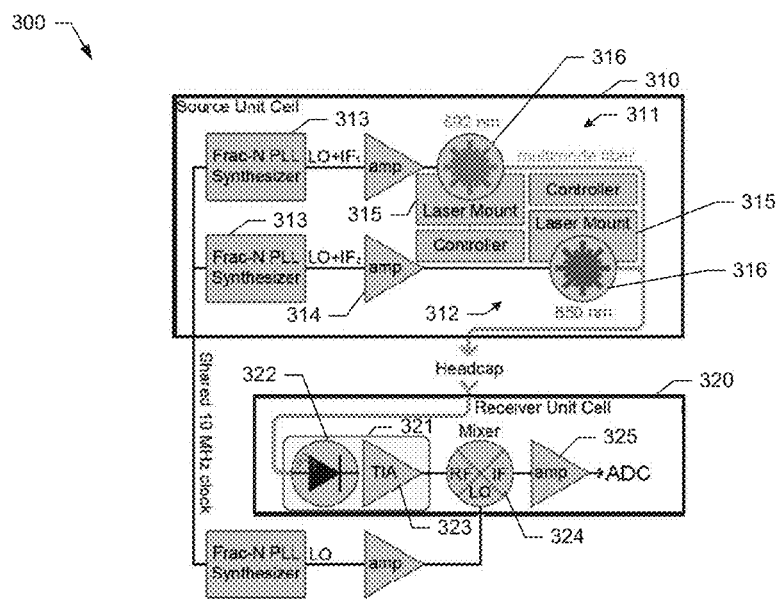
FIG. 3 illustrates source-detector pair according to some example embodiments.

Now referring to FIG. 3, an example source-detector pair that may be implemented in an FD-fNIRS system is shown. In this regard, the assembly 300 may comprise a source unit cell 310 operating as a light source and a receiver unit cell 320 operating as a detector. According to some example embodiments, any number of source unit cells 310 and receiver unit cells 320 may be included in an FD-fNIRS system. For example, in the implementation described below, six source unit cells 310 and twelve receiver unit cells 320 may be included, with the source unit cells 310 and receiver unit cells 320 being configured in a head-cap as interleaved source-detector pairs.

According to some example embodiments, one of the source unit cells 310 may be configured to deliver laser light of two wavelengths, $\lambda_1$=692 nm and $\lambda_2$=850 nm, from lasers 311 and 312, respectively. A DC bias of each laser 311 and 312 may be controlled such that, for example, 12.5 milliWatts (mW) average optical power can be provided at the scalp at each laser wavelength. Each of the twelve lasers in the respective six source unit cells 310 may be amplitude-modulated at a unique radio frequency at about 211 MHz, which may be the frequency of a local oscillator (LO) used for frequency down-conversion in the receiver unit cells 320. The twelve frequencies may be evenly spaced, for example, on a 1-kiloHertz (kHz) grid from 211.0135 MHz through 211.0245 MHz. The first two of these frequencies (211.0135 and 211.0145 MHz) are denoted in FIG. 3 as LO+IF$_1$ and LO+IF$_2$, respectively. For each laser, an AC component of the current may be generated using a dedicated fractional-N phase-locked-loop 313, which may be amplified via amplifiers 314 to achieve complete sinusoidal modulation of the laser's optical output. The AC and DC components of the current may be combined in a bias tee within the laser mounts 315, and then applied to the laser diodes 316. Each of the twelve photo-receivers 321 of the receiver unit cells 320 may be an avalanche photodiode 322 with an integral trans-impedance amplifier 323. The electrical output of each photo-receiver 321 may be down-converted, for example, to the audio spectrum using a double balanced mixer 324 with the local oscillator operating, for example, at 211 MHz. The intermediate-frequency (IF) output of the mixer may be amplified, via the amplifier 325, and then digitized at 192 kS/s in a bank of audio digitizers. Each digitized waveform potentially contains oscillatory components at each of twelve IF frequencies—13.5 kHz through 24.5 kHz with a 1-kHz spacing—one for each laser. The system may therefore simultaneously record complex signals from a total of, for example, 144 unique laser-detector pairs.

Due to the modulation of the light beam, FD-fNIRS systems can offer the ability to extract additional attributes regarding the light received at a detector within such a system. In this regard, the phase of the received light can provide a separate channel of encoded information about the link between the source and the detector. Moreover, based on the known phase of the light beam provided by the source (e.g., source unit cell 310) and the phase of the received light at a detector (e.g., receiver unit cells 320), a phase differential at the detector can be determined according to various example embodiments. In some instances, the phase differential can vary based on the path-length of the photons from the source to the detector and provide insights into the absorption of photons by the medium.

According to some example embodiments, the phase differential information that can be extracted from the received light at the detector can provide a basis for a useful metric for determining link quality for a source-detector pair within, for example, an FD-FNIRS system. The stability of the phase differential over a duration of time for a given source-detector link may define a stability metric, and therefore provide useful insights into the quality of the link for the purpose of identifying low quality spectroscopy data that can be handled accordingly (e.g., discarded). An additional benefit of using the phase differential as a basis for a link quality metric is that the resultant value can be a bounded indicator of link quality since the phase information is provided as a circular resultant. As such, variation in the link quality metric based on the phase differential can be limited in range, which may support a variety of computational benefits when used in further analyses.

Figure 4:
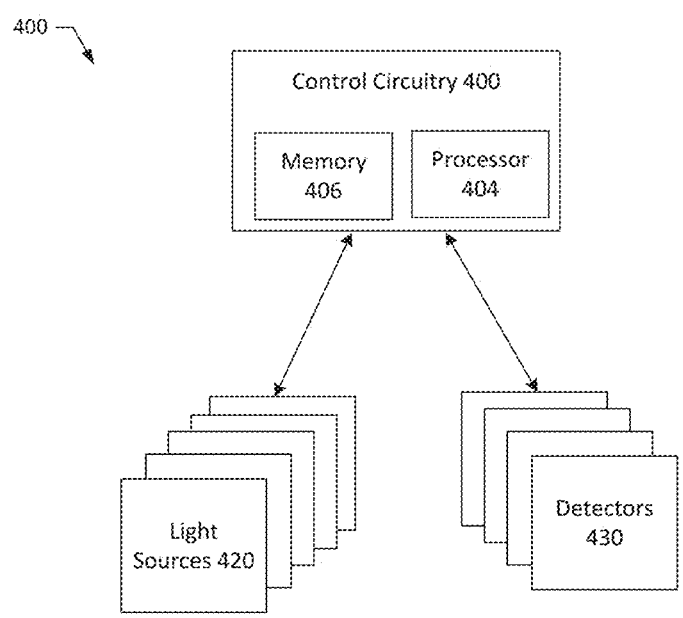
FIG. 4 illustrates a spectroscopy system according to some example embodiments.

Referring now to FIG. 4, a block diagram of a spectroscopy system 400 is shown. The spectroscopy system 400 may comprise control circuitry 400, which may be the same or similar in structure and operation as the control circuitry 140. The spectroscopy system 400 may also comprise a plurality of light sources 420 and a plurality of detectors 430. Each light source in the plurality of light sources 420 may be the same or similar in construction and operation as the light sources 120a and 120b, the light sources 220a, 220b, 220c, and 220d, or the source unit cell 310. Each detector within the plurality of detectors 430 may be the same or similar in construction and operation as the detectors 130a, 130b, and 130c, the detectors 230a, 230b, 230c, 230d, and 230e, the receiver unit cell 320. Additionally, the spectroscopy system 400 may include additional components not shown in FIG. 4 and the control circuitry 400 may be operably coupled to some of those additional other components for control or communication.

The control circuitry 400 may comprise a processor 404 and a memory 406. Further, according to some example embodiments, control circuitry 400 may be in operative communication with or embody, the memory 406 and the processor 404. According to some example embodiments, the control circuitry 400 may also include a communications interface, which may be configured to transmit instructions to, for example, a prosthetic, a computing system, or the like based on interpretation of spectroscopy data from the detectors 430. Through configuration and operation of the memory 406 and the processor 404, the control circuitry 400 may be configurable to perform various operations as described herein, including the operations and functionalities described with respect to spectroscopy data capture and analysis, and the classification of source-detector pairs and source-detector links based on phase differentials as described herein. In this regard, the control circuitry 400 may be configured to perform computational processing, memory management, control and monitoring, and communications management, or the like, according to an example embodiment. In some embodiments, the control circuitry 400 may be embodied as a chip or chip set. In other words, the control circuitry 400 may comprise one or more physical packages (e.g., chips) including materials, components, or wires on a structural assembly (e.g., a baseboard). The control circuitry 400 may be configured to receive inputs (e.g., via peripheral components), perform actions based on the inputs, and generate outputs (e.g., for provision to peripheral components). In an example embodiment, the control circuitry 400 may include one or more instances of a processor 404, associated circuitry, and memory 406. As such, the control circuitry 400 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 406 may include one or more non-transitory memory devices such as, for example, volatile or non-volatile memory that may be either fixed or removable. The memory 406 may be configured to store information, data, applications, instructions or the like for enabling, for example, the functionalities described with respect to spectroscopy data capture and analysis, and the classification of source-detector pairs and source-detector links based on phase differentials as described herein. The memory 406 may operate to buffer instructions and data during operation of the control circuitry 400 to support higher-level functionalities, and the memory 406 may be configured to store instructions for execution by the control circuitry 400. The memory 406 may also store various information including spectrometry data and the results of spectrometry analyses as described herein.

As mentioned above, the control circuitry 400 may be embodied in a number of different ways. For example, the control circuitry 400 may be embodied as various processing means such as one or more processors 404 that may be in the form of a microprocessor or other processing element, a coprocessor, a controller or various other computing or processing devices including integrated circuits such as, for example, an ASIC (application specific integrated circuit), an FPGA, or the like. In an example embodiment, the control circuitry 400 may be configured to execute instructions stored in the memory 406 or otherwise accessible to the control circuitry 400. As such, whether configured by hardware or by a combination of hardware and software, the control circuitry 400 may represent an entity (e.g., physically embodied in circuitry—in the form of control circuitry 400) capable of performing operations according to example embodiments while configured accordingly. Thus, for example, when the control circuitry 400 is embodied as an ASIC, FPGA, or the like, the control circuitry 400 may be specifically configured hardware for conducting the operations described herein. Alternatively, as another example, when the control circuitry 400 is embodied as an executor of software instructions, the instructions may specifically configure the control circuitry 400 to perform the operations described herein.

According to some example embodiments, the control circuitry 400 may be configured to determine a source-detector link quality metric for a source-detector link. In this regard, according to some example embodiments, the control circuitry 400 may be configured to control the light sources 420 to output source light beams directed at an object. The light sources 420 may be configured to output the source light beams as frequency modulated light beams, for example, within an FD-fNIRS system. In this regard, each light source 420 may be configured to output at least one source light beam at different frequency from any other light source 420.

The control circuitry 400 may also be configured to receive detector-specific data from each of the detectors 430. In this regard, as described herein, each detector 430 may receive light that is source from many of the light sources 420. As such, each detector 430 may receive the light and convert the light into electrical signals representative of the received light for provision to the control circuitry 400 for processing. The detector-specific data may therefore include data components that are associated with light originating from more than one of the light sources 420. However, because each light source 420 may output light at a different frequency, the control circuitry 400 may be configured to isolate the portions of the detector-specific data that are associated with each light sources 420. Such isolation may be performed, for example, in frequency domain using a spectral filter. In doing so, the control circuitry 400 may be identifying spectroscopy data that is associated with a respective source-detector pair, also referred to as source-detector link data.

Additionally, the control circuitry 400 may be configured to determine, for each source-detector pair or each source-detector link, a link phase differential based on the source-detector link data. The link phase differential may be determined by, for example, subtracting a phase measurement from the source-detector link data from the phase measurement of the source light beam at a given time. The determination of the link phase differential may be performed repeatedly at regular intervals of time to determine a plurality of link phase differentials for a given link.

According to some example embodiments, the control circuitry 400 may be further configured to determine a source-detector link quality metric for each source-detector link. In this regard, the source-detector link quality metric may be determined based on the determined link phase differential for a given link. More specifically, according to some example embodiments, the source-detector link quality metric may be determined as a stability metric based on the stability of the link phase differential values over a duration of time. Alternatively, for a given source-detector pair's IQ or quadrature time series, source-detector link quality metric as a measure of phase stability may be calculated as the circular standard deviation of phase for a recording duration. In some example embodiments, a portion of the beginning and end of the recorded data may be clipped from the data set (e.g., one second of data at the beginning and one second of data at the end) and the resultant clipped data may be use for determining the source-detector link quality metric.

As such, links with low stability or high volatility may have a low source-detector link quality metric, while link with high stability or low volatility may have a high source-detector link quality metric. In many instances, the presence of noise may give rise to low phase differential stability or low source-detector link quality. According to some example embodiments, the detector-specific data for a given source-detector link may be down-selected based on source-detector link quality metric for the link. In this regard, quality phase data may have a stable phase-offset with very small and low-frequency deviations. The source-detector link quality metric defined herein may be highly correlated with log-mean light levels, but can be a more useful diagnostic of link quality when system interference may result in phase artifacts, even in the presence of high quality magnitude data.

According to some example embodiments, the equations for determining the source-detector link quality metric may be provided as:

$$\bar{p} = \frac{1}{N} \sum_{n=1}^{N} e^{i\theta_N} \quad \bar{\theta} = \text{Arg}(\bar{p}).$$

$$\bar{R} = \left| \frac{1}{N} \sum_{n=1}^{N} e^{i\theta_N - \bar{\theta}} \right| \quad [0-1], \sim \text{std of angles}$$

$\bar{p}$ with being the mean circular resultant of a sample of phase values, calculated from a sample of N phase values $\theta$, and $\bar{R}$ being the length of the sample mean resultant; as a bounded metric constituting the phase stability metric. The value for $\bar{R}$ can therefore be an indicator of link quality and can define a source-detector link quality metric that is bounded, such that the value approaches a maximum bounded value of one (1). Further, the minimum bounded value of may be zero (0). Accordingly, as $\bar{R}$ increases, the stability decreases and therefore high values of $\bar{R}$ indicate highly instable source-detector links and low values of the $\bar{R}$ indicate highly stable source-detector links. In practice, phase values are sampled from a short recording period, but can also be calculated in short-time windows as a time-varying metric of source-detector link quality. Link quality calculated as a function of time can also be used to isolate periods of movement artifact, as well as the presence of movement of tissues within the recording medium.

Figure 5A:
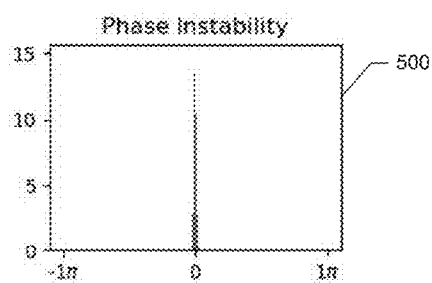
FIGS. 5A-5D illustrate graphs of phase instability in different signal-to-noise ratio environments according to some example embodiments.
Figure 5B:
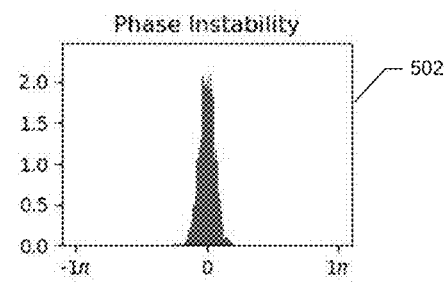
Figure 5C:
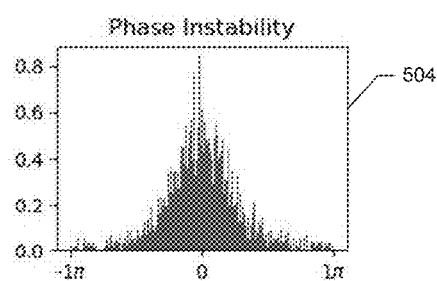
Figure 5D:
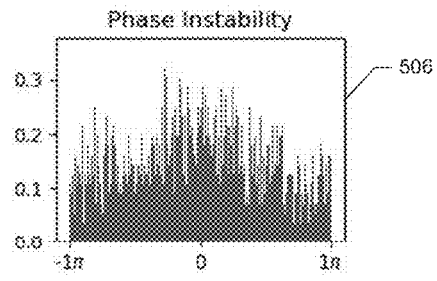
Figure 5E:
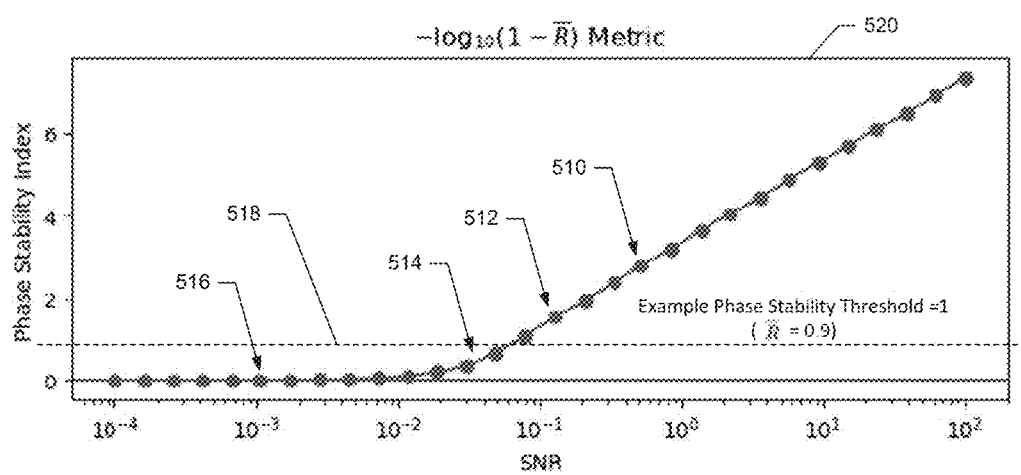
FIG. 5E illustrates a graph of a phase stability index with respect to signal-to-noise ratio according to some example embodiments.

In this regard, FIGS. 5A-5D illustrate graphs of phase instability present in an example spectroscopy system due to the presences of noise according to some example embodiments. In this regard, the graph 500 of FIG. 5A shows a very high phase instability where the signal-to-noise ratio (SNR) is very high. The graph 502 of FIG. 5B shows a moderately high phase instability where the SNR is moderately high. The graph 504 of FIG. 5C shows a moderately low phase instability where the SNR is moderately low, and graph 506 of FIG. 5D shows a low phase instability where the SNR is low. In view of these graphs and the corresponding relationship, a phase stability index representing the quality of a phase measurement from a source-detector pair or link can be defined and plotted against SNR as shown in the graph 520 of FIG. 5E. The phase stability index is, according to some example embodiments, determined or calculated based on the value of $\overline{R}$, also referred to as the length of the sample mean resultant. For example, in the graph 530, the phase stability index is calculated as $-\log_{10}(1-\overline{R})$. Since this expression is only a function of $\overline{R}$, the value of $\overline{R}$ will dictate the value of the phase stability index. In this regard, the following Table 1 shows some values of $\overline{R}$ and the associated phase stability index.

TABLE 1

| $\overline{R}$ | Phase Stability Index |
|---|---|
| 0.05 | 0.02 |
| 0.5 | 0.3 |
| 0.9 | 1 |
| 0.999 | 3 |
| 0.999999 | 5.99 |

As can be seen in the graph 520, the phase stability index is shown in relation to SNR. The graph of this relationship decays towards zero in a non-linear fashion at low SNRs, but becomes linear at higher SNRs. In this regard, low phase stability index values are indicative of high stability links. As such, high phase instability (or low phase stability) shown in graph 500 may be indicated on graph 520 at 510 in the linear portion (at a phase stability index value of about 3). Similarly, the moderately high phase instability (or moderately low phase stability) shown in graph 502 may be indicated on graph 520 at 512 in the linear portion (at a phase stability index value of about 1.9). The moderately low instability (or moderately high stability) shown in graph 504 may be indicated on graph 520 at 514 at the transition from the linear portion to the non-linear portion (at a phase stability index value of about 0.75). Further, the low phase instability (or high phase stability) shown in graph 506 may be indicated on graph 520 at 516 within the non-linear portion (at a phase stability index value of about 0.1).

Based on these graphs and the relationship with the SNR, an example phase stability threshold 518 for identifying a good link (good source-detector pair) and associated good data or bad link (bad source-detector pair) and associated bad data may be defined, for example, near the linear-to-non-linear transition. If defined with respect to the phase stability index, the phase stability threshold may be defined at a value of 1. According to some example embodiments, the phase stability threshold may be alternatively defined with a range of values between about 0.9 to about 1.5. As such, links have a phase stability index that is greater than the phase stability threshold may be considered bad links and the associated data from those links, for example, may be discarded from further analyses. However, links having a phase stability index of less than the phase stability threshold may be considered good links and the associated data from those links may be included in further analyses.

Following from the description above, the phase stability threshold may alternatively be defined with respect to the length of the sample mean resultant $\overline{R}$ directly. According to some example embodiments, if $\overline{R}$ is the basis for defining the phase stability threshold used to differentiate good links from bad links, the phase stability threshold may be defined as 0.9. Accordingly, links with an $\overline{R}$ that is less than the threshold may be considered good links, while links that are greater than the phase stability threshold may be bad links, as described above. Alternatively, a phase stability threshold based on $\overline{R}$ may be defined, according to some example embodiments, within a range of values from 0.99 to 0.85. In some example embodiments, the phase stability threshold based on $\overline{R}$ may be defined as about 0.995 or 0.9.

Figure 6:
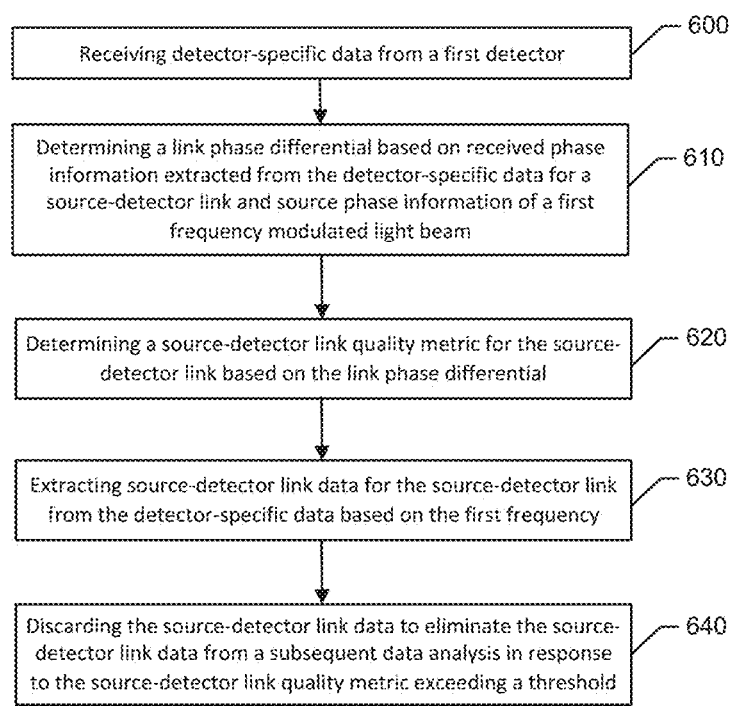
FIG. 6 illustrates a flow chart of an example method for spectroscopy analysis according to some example embodiments.

Having described various example embodiments in the form of a system and apparatus, the following describes an example method for spectroscopy data analysis according to some example embodiments as provided in the flowchart of FIG. 6. In this regard, the example method may be performed, for example, by the control circuitry 400.

According to some example embodiments, the example method may comprise, at 600, receiving detector-specific data from a first detector. The first detector may be one of a plurality of detectors within a spectroscopy system. The detector-specific data may be representative of scattered and unabsorbed light received at the first detector resultant from frequency modulated light beams from a plurality of light sources interacting with an object. A first light source may be one of the plurality of light sources that outputs a first frequency modulated light beam at a first frequency.

According to some example embodiments, the example method may further comprise, at 610, determining, for a source-detector link defined by a pairing of the first light source with the first detector, a link phase differential based on received phase information extracted from the detector-specific data for the source-detector link and source phase information of the first frequency modulated light beam. Additionally, the example method may comprise, at 620, determining a source-detector link quality metric for the source-detector link based on the link phase differential. Further, at 630, the example method may comprise extracting source-detector link data for the source-detector link from the detector-specific data based on the first frequency, and, at 640, discarding the source-detector link data to eliminate the source-detector link data from a subsequent data analysis in response to the source-detector link quality metric exceeding a threshold.

According to some example embodiments, the example method may further comprise determining the source-detector link quality metric based on a stability of the link phase differential over a duration of time. Additionally or alternatively, the threshold may be a phase stability threshold. Additionally or alternatively, the source-detector link quality metric may be a bounded indicator of phase stability for source-detector link. Additionally or alternatively, the first frequency modulated light beam may be near-infrared light with a wavelength of about 690 nanometers (nm) to about 850 nm. Additionally or alternatively, the first frequency is greater than 10 mega-hertz (MHz). Additionally or alternatively, the object may be neural tissue. Additionally or alternatively, the spectroscopy system may be a frequency-domain extension of a functional near infrared spectroscopy (FD-fNIRS) system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements That which is claimed:

1. A spectroscopy system comprising:
a plurality of light sources comprising a first light source, each light source being configured to output a frequency modulated light beam of a different frequency than the other light sources, the first light source being configured to output a first frequency modulated light beam at a first frequency;
a plurality of detectors comprising a first detector, each detector being configured to receive light and provide detector-specific data representative of the received light, wherein a pairing of a light source with a detector is a source-detector pair that defines a source-detector link; and
control circuitry configured to:
control each light source to output the frequency modulated light beams into an object;
receive detector-specific data from the first detector, the detector-specific data being representative of scattered and unabsorbed light received at the first detector resultant from the frequency modulated light beams interacting with the object;
determine, for a source-detector link defined by a pairing of the first light source with the first detector, a link phase differential based on received phase information extracted from the detector-specific data for the source-detector link and source phase information of the first frequency modulated light beam; and
determine a source-detector link quality metric for the source-detector link based on the link phase differential.

2. The spectroscopy system of claim 1, wherein the control circuitry is configured to:
extract source-detector link data for the source-detector link from the detector-specific data based on the first frequency; and
discard the source-detector link data to eliminate the source-detector link data from a subsequent data analysis in response to the source-detector link quality metric exceeding a threshold.

3. The spectroscopy system of claim 1, wherein the control circuitry is configured to determine the source-detector link quality metric based on a stability of the link phase differential over a duration of time.

4. The spectroscopy system of claim 3, wherein the control circuitry is configured to:
extract source-detector link data from the detector-specific data based on the first frequency; and
discard the source-detector link data to eliminate the source-detector link data from a subsequent data analysis in response to the source-detector link quality metric exceeding a phase stability threshold.

5. The spectroscopy system of claim 1, wherein the source-detector link quality metric is a bounded indicator of phase stability for source-detector link.

6. The spectroscopy system of claim 1, wherein the first frequency modulated light beam is output as near-infrared light with a wavelength of about 690 nanometers (nm) to about 3000 nm.

7. The spectroscopy system of claim 1, wherein the first frequency is greater than 10 mega-hertz (MHz).

8. The spectroscopy system of claim 1, wherein the object is neural tissue.

9. The spectroscopy system of claim 1, wherein the control circuitry is configured to operate the plurality of light sources and the plurality of detectors as a frequency-domain extension of a functional near infrared spectroscopy (FD-fNIRS) system.

10. A system for spectroscopy data analysis, the system comprising control circuitry configured to:
receive detector-specific data from a first detector, the first detector being one of a plurality of detectors within a spectroscopy system, the detector-specific data being representative of scattered and unabsorbed light received at the first detector resultant from frequency modulated light beams from a plurality of light sources interacting with an object, a first light source being one of the plurality of light sources that outputs a first frequency modulated light beam at a first frequency;
determine, for a source-detector link defined by a pairing of the first light source with the first detector, a link phase differential based on received phase information extracted from the detector-specific data for the source-detector link and source phase information of the first frequency modulated light beam;
determine a source-detector link quality metric for the source-detector link based on the link phase differential;
extract source-detector link data for the source-detector link from the detector-specific data based on the first frequency; and
discard the source-detector link data to eliminate the source-detector link data from a subsequent data analysis in response to the source-detector link quality metric exceeding a threshold.

11. The system of claim 10, wherein the control circuitry is configured to determine the source-detector link quality metric based on a stability of the link phase differential over a duration of time.

12. The system of claim 11, wherein the threshold is a phase stability threshold.

13. The system of claim 10, wherein the source-detector link quality metric is a bounded indicator of phase stability for source-detector link.

14. The system of claim 10, wherein the first frequency modulated light beam is near-infrared light with a wavelength of about 690 nanometers (nm) to about 3000 nm.

15. The system of claim 10, wherein the first frequency is greater than 10 mega-hertz (MHz).

16. The system of claim 10, wherein the object is neural tissue.

17. The system of claim 10, wherein the spectroscopy system is a frequency-domain extension of a functional near infrared spectroscopy (FD-fNIRS) system.

18. A method for spectroscopy data analysis, the method comprising:
receiving detector-specific data from a first detector, the first detector being one of a plurality of detectors within a spectroscopy system, the detector-specific data being representative of scattered and unabsorbed light received at the first detector resultant from frequency modulated light beams from a plurality of light sources interacting with an object, a first light source being one of the plurality of light sources that outputs a first frequency modulated light beam at a first frequency;

determining, for a source-detector link defined by a pairing of the first light source with the first detector, a link phase differential based on received phase information extracted from the detector-specific data for the source-detector link and source phase information of the first frequency modulated light beam;

determining a source-detector link quality metric for the source-detector link based on the link phase differential;

extracting source-detector link data for the source-detector link from the detector-specific data based on the first frequency; and discarding the source-detector link data to eliminate the source-detector link data from a subsequent data analysis in response to the source-detector link quality metric exceeding a threshold.

19. The method of claim 18, wherein determining the source-detector link quality metric comprises determining the source-detector link quality metric based on a stability of the link phase differential over a duration of time.

20. The method of claim 18, wherein the threshold is a phase stability threshold.

* * * * *